United States Patent Office 3,732,334
Patented May 8, 1973

---

3,732,334
GRAFT COPOLYMERIC LUBRICATING OIL ADDITIVES
Ernst Koch, Traisa Uber Darmstadt, and Ulrich Schoedel, Rossdorf, Germany, assignors to Rohm GmbH, Darmstadt, Germany
No Drawing. Continuation-in-part of abandoned application Ser. No. 792,762, Jan. 21, 1969. This appplication June 16, 1971, Ser. No. 153,899
Claims priority, application Germany, Jan. 23, 1968, P 17 45 359.7
Int. Cl. C08f 29/50, 33/08
U.S. Cl. 260—875　　　　　　　　　　　　　　　　8 Claims

ABSTRACT OF THE DISCLOSURE

Graft copolymers useful as lubricating oil additives and prepared by grafting an imidazole having an olefinically unsaturated group in the 1-position, e.g. a 1-vinyl-2-alkyl-imidazole, on a backbone polymer comprising acrylate, methacrylate, fumarate, and/or itaconate esters.

---

This application is a continuation-in-part of copending application Ser. No. 792,762 filed Jan. 21, 1969, now abandoned.

The present invention relates to graft copolymers useful as lubricating oil additives.

Lubricating oil additives having a dispersant and detergent effect and which are the condensation products of certain polyamines with polyisobutylene are already known in the art. However, their detergent effect is not suitable to meet the demands which arise when they are used in practice. Further, copolymers prepared by grafting nitrogen-containing monomer mixtures onto an oil-soluble polymer backbone are known as dispersing additives having no detergent effect worth mentioning. Such graft copolymers are prepared, for example according to U.S. Pat. 3,087,875, by radiation-induced polymerization of nitrogenous monomers in the presence of polymers of higher methacrylic acid esters. The products prepared by these methods using high-energy radiation have not achieved any practical significance.

U.S. Pat. 3,088,931 similarly teaches the use of high-energy ionizing radiation, or ozone treatment, for the grafting of polar nitrogenous monomers including N-vinylimidazole, onto a backbone copolymer of isobutylene which must critically contain comonomers such as vinyl ether or styrene which contain active hydrogen atoms furnishing grafting sites.

High energy ionizing radiation, such as from naturally radioactive materials or nuclear fission products, is also used in U.S. Pat. 3,089,832 to graft certain vinyl substituted organic nitrogen compounds, such as N-vinyl pyrrolidone, on a variety of homopolymer and copolymer backbones, including polymers containing acrylate and methacrylate esters.

Lubricating oil additives are produced technically on a large scale according to German Patent Publication 1,118,971 by the free-radical polymerization of monomers forming oil-soluble polymers. After 40 to 85 percent of the monomers are polymerized, they are combined with a nitrogenous monomer and the polymerization is carried out further to completion. Products prepared in this manner show a satisfactory dispersing effect if they have a content of, for example, at least 8 percent by weight of N-vinyl pyrrolidone in the polymer.

More efficacious products are disclosed in British Pat. 1,068,283. These products are taught to be prepared by the free-radical graft copolymerization of an unsaturated compound having a tertiary nitrogen atom onto a backbone polymer comprising isobutylene, acrylic or methacrylic acid esters having at least 8 carbon atoms in the alcohol portion thereof, fumaric acid esters or itaconic acid esters having 8 to 18 carbon atoms in the alcohol portion, mixtures of these esters with each other or with up to 50 percent by weight of acrylic or methacrylic acid esters having 1 to 4 carbon atoms in the alcohol portion, amino alkyl esters of acrylic acid or methacrylic acid, vinyl acetate, or mixtures of these monomers. The unsaturated nitrogen compound is present in an amount from 2 to 30 percent by weight of the backbone polymer, preferably between 3 and 4.5 percent by weight. As the nitrogen-containing compound, N-vinyl pyrrolidone is preferably employed. By "free radical" polymerization is to be understood polymerization occurring in the presence of radical-forming polymerization initiators such as azo compounds or peroxides, and not polymerization initiated by the use of high-energy radiation.

The addition of about 3 percent of such graft copolymers imparts good dispersant properties to lubricating oils but, in tests run in diesel engines over 50 hours, gives a value of only 75 points according to the method for determining detergent effect disclosed by E. Kruppke in "The Engine Testing of Crank Case Lubricating Oils: Engine Testing and Evaluation of Crank Case Lubricants," Report of the Institute of Petroleum Conference, Brighton, May 17–19, 1961, pp. 53–67 (1962). An improvement in efficacy above this value is only possible by substantially increasing the amount of the nitrogenous monomer in the additive.

It has now been found that the detergent working of lubricating oil additives can be considerably increased if polymerizable derivatives of imidazole of the general formula

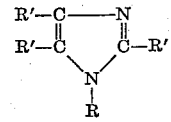

in which formula R is a group having a polymerizable carbon-carbon double bond, such as a vinyl, isopropenyl, acryloxyalkyl, or methacryloxy-alkyl group, and R' represents the same or different radicals selected from the group consisting of hydrogen, alkyl, and aralkyl, and wherein two radicals R' on adjacent carbon atoms can be joined in a ring, are employed as a nitrogenous comonomer for graft polymerization on a backbone polymer. These imidazole monomers are employed in amounts up to 30 percent by weight, preferably from 2 to 10 percent by weight, of the backbone polymer. However, with a minimal content of imidazole, such as 2 percent, other nitrogenous monomers of the type described in British Pat. 1,068,283 can be jointly employed, for example N-vinyl pyrrolidone, N-vinyl succinimide, N-vinyl-N-ethyl acetamide, or N-vinyl-N-methyl benzamide.

The products of the present invention are graft copolymers whose principal chain comprises acrylic acid esters or methacrylic acid esters of alcohols, e.g. of monohydric alkanols, having at least 8, preferably 12 to 16, carbon atoms in the alcohol group; fumaric acid esters or itaconic acid esters of alcohols, e.g. of monohydric alkanols, having 8 to 18 carbon atoms in the alcohol group; or mixtures of these esters with each other or with up to 50 percent, by weight of the total mixture, of acrylic or methacrylic acid esters of alcohols, e.g. of monohydric alkanols, having 1 to 4 carbon atoms; of aminoalkyl esters, such as N,N-dilower alkyl amino lower alkyl esters, of acrylic acid or methacrylic acid; of vinyl acetate; or of mixtures of these last-mentioned comonomers. The branches grafted onto such a backbone may comprise up to 50 percent by weight of one or more other unsaturated compounds having a tertiary nitrogen atom, the balance being an imidazole as described. In the copolymers, the weight of the grafted branches is from 2 to 30 percent of the weight of the principal chain.

In addition to nitrogenous monomers, the grafted branches can also comprise monomer units of nitrogen-free esters of acrylic acid, methacrylic acid, itaconic acid, or fumaric acid. Graft copolymers of this type arise, for example, when an ester employed for the preparation of the backbone polymer is not completely polymerized, e.g. is only about 90 percent polymerized, so that the remaining unpolymerized monomer is graft polymerized onto the polymer backbone together with the nitrogenous monomer.

The improved detergent efficacy imparted by the presence of imidazole derivatives in the graft copolymers of the invention was surprising and unforeseeable since a comparable detergent effect is not obtained with nitrogen compounds of similar structure such as vinyl pyrrolidone, grafted onto the same backbone polymers, until the amount of these nitrogen compounds in the copolymer is increased to a multiple of the quantity of polymerizable imidazole derivatives used according to the present invention.

The special effect of the polymerizable imidazole derivatives is evident even for simple derivatives of imidazole, for example for N-vinyl imidazole, but is particularly so for those imidazole derivatives which are alkyl-substituted in the 2-position. Among these, the derivatives of 2-methyl, 2-ethyl-, 2-isopropyl-, and of 2-t-butyl-imidazole are particularly noteworthy. Because of the ease with which the materials can be produced in technical quantities, those imidazole derivatives having an N-vinyl group as the polymerizable group R are preferred. Further suitable groups are, for example, the N-methacryloxyethyl- or the N-acrylamidoethyl group. 1-vinyl-2-methyl-imidazole and 1-vinyl-2-ethyl-imidazole are particularly preferred because they simultaneously offer easy availability in technical quantities, good polymerizability, and the imparting of a high dispersant and detergent effect.

The polymerization is, as a rule, easily carried out as a solution polymerization in oil with one of the known chemical free-radical forming polymerization initiators such as azo diisobutyric acid dinitrile, azo diisobutyric acid diethyl ester, t-butyl perbenzoate, or t-butyl peroctoate, advantageously with the exclusion of air. Polymerization in other solvents is possible It has proved difficult to graft copolymerize imidazole monomers onto a polyisobutylene backbone using the same techniques employed for preparing the graft copolymers according to the invention. Thus, attempts to graft copolymerize N-vinyl imidazoles onto a polyisobutylene backbone polymer in oil have been unsuccessful. In xylene, small quantities of a graft copolymer are obtained together with a predominant amount of a homopolymer of the grafting comonomer. The polymer product is inferior as a lubricating oil additive in comparison with graft copolymers prepared using the backbone polymers employed according to the present invention.

The molecular weight of the graft copolymer of the invention is essentially determined by the backbone polymer employed. The molecular weight of the final product is increased over that of the backbone polymer by the graft polymerization in dependence on the amount of grafting monomer employed. Lubricating oil additives which are to be used in lubricating oils in the amounts heretofore conventionally employed are generally prepared from basic polymers having a molecular weight between about 400,000 and 1,000,000. However, it is preferred to start out with a backbone polymer having a molecular weight of less than 150,000 and then to add correspondingly larger amounts of the graft copolymer obtained therefrom to a lubricating oil. The lifetime of the treated lubricating oil is considerably increased in this manner without the production of undesirable piston deposits which are familiar to the skilled artisan as a consequence of the use of polymeric lubricating oil additives. This property of the products prepared according to the present invention makes the use of additional detergents unnecessary.

It has further been found that those products prepared according to the present invention which have as the backbone polymer a material of a molecular weight from about 10,000 to 70,000 considerably reduce wear in heavily loaded bearings, particularly if the additives are used together with small amounts of a zinc dialkyl dithiophosphate. The present invention is therefore practiced to particular advantage with such polymers. The economic disadvantage that relatively large quantities (i.e. about 10–12 percent) of the graft copolymer prepared from this low molecular weight material must be added to a lubricating oil is counterbalanced by the advantage that the total amount of the additives necessary is less than, or does not significantly exceed, the total quantity of materials heretofore used because additional detergents are not required. Backbone polymers having a molecular weight below about 5000 are not suitable for the preparation of lubricating oil additives according to the present invention.

The lubricating oil additives according to the present invention can be added to any commercially available oil. However, their outstanding properties are most fully realized if relatively large quantities of a low molecular weight graft copolymer are combined with low viscosity petroleum. Combinations of this type can be characterized as genuine multigrade oils.

In the following examples, the preparation of graft copolymers according to the invention is described. The molecular weights ("MW") of the backbone polymers are average molecular weight values determined by light-scattering methods in butyl acetate solutions at 20° C. using a "Sofica" photogonio-diffusometer.

The dispersant and detergent effects of the graft copolymers obtained were judged according to the Kruppke test mentioned earlier, employing a diesel engine of the Motorenwerke Mannheim (MWM), over a period of 50 hours. The criterion used for evaulation is the cleanliness of the piston. Complete cleanliness is evaluated as 100 points: total soiling is evaulated as 0 points.

A better understanding of the present invention and of its many advantages will be had by referring to the following specific examples, given by way of illustration, in which all parts are by weight.

EXAMPLE 1

90 parts of a copolymer (molecular weight of about 70,000 as determined by light scattering) comprising 10 parts of methyl methacrylate and 90 parts of a mixture of memthacrylic acid esters of fatty alcohols (average C-content=14.0) were dissolved in 100 parts by weight of a mineral oil (viscosity=4.0 centistokes at 98.89° C.). The solution was combined with 10 parts of 1-vinyl-2-methyl-imidazole and 0.5 part of t-butyl-perbenzoate solution (50 percent in mineral oil) and polymerized with stirring and exclusion of air for about eight hours at 130° C. After 1 hour and again after 3 hours, a portion of about 0.1 part of the t-butyl-perbenzoate solution was added.

An MWM-diesel test according to the investigative method described above gave 91 points.

EXAMPLE 2

95 parts of a copolymer (MW about 30,000) comprising 4 parts of methacrylate, 10 parts of methyl methacrylate, and 86 parts of a mixture of methacrylic acid esters of fatty alcohols (average C-content=14.0), dissolved in 100 parts of the mineral oil mentioned in Example 1, were combined with 5 parts of 1-vinyl-2-methyl-imidazole and 0.5 part of t-butyl-perbenzoate solution (5 percent in mineral oil), and polymerized for about 8 hours at 130° C. with stirring and exclusion of air.

Piston cleanliness in the MWM-diesel test run was rated at 90 points.

EXAMPLE 3

Example 1 was repeated with the exception that 1-vinyl-2-ethyl imidazole was employed rather than 1-vinyl-2-methyl imidazole.

With the graft copolymer obtained, a piston rating of 89 points was achieved in the MWM-diesel test.

EXAMPLE 4

90 parts of a copolymer (MW about 70,000) comprising 45 parts of butyl methacrylate and 55 parts of a mixture of methacrylic acid esters of fatty alcohols (average C-content=14.0), dissolved in 100 parts of mineral oil, were combined with 10 parts of 1-vinyl-2-methyl imidazole and 0.5 part of t-butyl-perbenzoate solution (50 percent in mineral oil) and polymerized with stirring and exclusion of air for about 8 hours at 130° C. After reaction time of 1 hour and 3 hours respectively, additional portions each comprising 0.1 part of t-butyl-perbenzoate solution were added.

In the MWM-diesel test, the piston cleanliness using this additive was rated at 90 points.

EXAMPLE 5

Example 1 was repeated except that 1-vinyl-imidazole was employed instead of 1-vinyl-2-methyl imidazole.

In the MWM-diesel test run, a rating of 86 points was obtained with this material.

EXAMPLE 6

A graft copolymer was produced according to the process of Example 1 employing a backbone polymer with an MW of 500,000.

The MWM-diesel test run gave 88 points.

EXAMPLE 7

Example 1 was repeated except that 1-vinyl-2-phenyl imidazole was employed in place of 1-vinyl-2-methyl imidazole.

In the MWM-diesel test, a rating of 85 points was attained.

EXAMPLE 8

Example 1 was repeated except that 1-vinyl-4,5-benzimidazole was substituted for 1-vinyl-2-methyl imidazole.

The MWM-diesel test gave an 85-point rating.

EXAMPLE 9

92.4 parts of a copolymer (MW about 30,000 as determined by light scattering) comprising 4 parts of methyl acrylate, 12 parts of methyl methacrylate, and 84 parts of a mixture of methacrylic acid esters of fatty alcohols (average C-content=14), dissolved in 100 parts by weight of mineral oil (viscosity=4.0 centistokes at 98.89° C.), were combined with 7.6 parts of 1-vinyl-2-pentyl-imidazole and 0.5 part of t-butyl-perbenzoate solution (50 percent in mineral oil) and polymerized with stirring and exclusion of air for about 8 hours at 130° C. After 1 hour and 3 hours respectively, portions of t-butyl perbenzoate solution each comprising 0.1 part were added.

The MWM-diesel test gave a rating of 86 points.

EXAMPLE 10

90 parts of a copolymer (MW of 50,000) comprising 18 parts of vinyl acetate and 82 parts of fumaric acid diesters of fatty alcohols (average C-content=14), dissolved in 100 parts of mineral oil (viscosity=4.0 centistokes at 98.89° C.), were combined with 10 parts of 1-vinyl-imidazole and 0.5 part of t-butyl-perbenzoate solution (50 percent in mineral oil) and then polymerized with stirring and exclusion of air for 8 hours at 130° C. After reaction periods of 1 hour and 3 hours respectively, portions of the t-butyl perbenzoate solution each comprising 0.1 part were added.

The MWM-diesel test gave a rating of 87 points.

EXAMPLE 11

90 parts of a copolymer (MW about 30,000) comprising 10 parts of N-dimethyl aminoethyl acrylate and 90 parts of a mixture of methacrylic acid esters of fatty alcohols (average C-content=14), dissolved in 100 parts of mineral oil (viscosity=4.0 centistrokes at 98.89° C.), were combined with 10 parts of 1-vinyl-imidazole and 0.2 part of t-butyl-perbenzoate solution (50 percent in mineral oil) and polymerized with stirring and exclusion of air for about 8 hours at 130° C. After reaction times of 1 hour and 3 hours respectively, portions each comprising 0.1 part of t-butyl perbenzoate solution were added.

The MWM-diesel test gave an 89-point rating.

EXAMPLE 12

85 parts of a monomer mixture of methacrylic acid esters of fatty alcohols (average C-content=14.0) were dissolved in 150 parts by weight of a mineral oil (viscosity=4.0 centistrokes at 98.89° C.) and 1.0 part by weight of a solution of t-butyl-perbenzoate (50 percent in mineral oil) were added. Polymerization was performed with stirring and exclusion of air at 110° C. until a conversion of 92 percent was achieved. 10 parts by weight of N-vinyl-imidazole and 5 parts of N-vinyl-pyrrolidone were then added and polymerization continued. After 1 hour a portion of 0.5 part of the t-butyl-perbenzoate solution was added and the polymerization was completed at 110° C.

The MWM-diesel test gave an 87-point rating.

What is claimed is:

1. A graft copolymer having a molecular weight of at least 5000 and consisting essentially of 100 parts by weight of a backbone polymer of a monomer selected from the group consisting of acrylic and methacrylic acid esters having at least 8 carbon atoms in the alcohol portion thereof; fumaric and itaconic acid esters having 8 to 18 carbon atoms in the alcohol portion thereof; mixtures of these aforementioned esters with each other; and mixtures of these aforementioned esters with up to 50 percent by weight of a comonomer selected from the group consisting of acrylic and methacrylic acid esters having 1 to 4 carbon atoms in the alcohol portion thereof, aminoalkyl esters of acrylic and methacrylic acids, vinyl acetate, and mixtures of these comonomers; said graft copolymer further consisting essentially of from about 2 to about 30 parts by weight of branches grafted onto said backbone polymer, said branches comprising a polymerizable imidazole of the formula

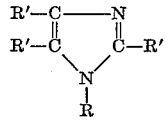

wherein R is a group having a polymerizable olefinic bond therein, R' taken alone is selected from the group consisting of hydrogen, alkyl, and aralkyl, and the two R's on adjacent carbon atoms may, together with these carbon atoms, form a ring.

2. A graft copolymer as in claim 1 wherein R is selected from the group consisting of vinyl, isopropenyl, acryloxy alkyl, and methacryloxy alkyl.

3. A graft copolymer as in claim 1 wherein said imidazole is a 2-alkyl imidazole.

4. A graft copolymer as in claim 1 wherein said imidazole is selected from the group consisting of 1-vinyl-2-methyl imidazole and 1-vinyl-2-ethyl imidazole.

5. A graft copolymer as in claim 1 wherein said backbone polymer has an average molecular weight between about 5000 and about 150,000.

6. A graft copolymer as in claim 1 wherein said backbone polymer has an average molecular weight between about 10,000 and about 70,000.

7. A graft copolymer as in claim 1 wherein said grafted branches include up to 50 percent by weight of an unsaturated tertiary nitrogen compound selected from the group consisting of N-vinyl lactams, cyclic N-vinyl imides, and N-vinyl carboxylic acid amides, the balance being said imidazole.

8. A graft copolymer having a molecular weight of at least 5000 and consisting essentially of at least about 90 parts by weight of a backbone polymer of a monomer selected from the group consisting of acrylic and methacrylic acid esters having at least 8 carbon atoms in the alcohol portion thereof; fumaric and itaconic acid esters having 8 to 18 carbon atoms in the alcohol portion thereof; mixtures of these aforementioned esters with each other; and mixtures of these aforementioned esters with up to 50 percent by weight of a comonomer selected from the group consisting of acrylic and methacrylic acid esters having 1 to 4 carbon atoms in the alcohol portion thereof, aminoalkyl esters of acrylic and methacrylic acids, vinyl acetate, and mixtures of these comonomers; said graft copolymer further consisting essentially of from about 2 to about 40 parts by weight of branches grafted onto said backbone polymer, said branches comprising from about 2 to about 30 parts by weight of a polymerizable imidazole of the formula

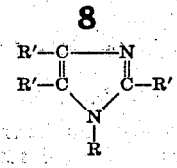

wherein R is a group having a polymerizable olefinic bond therein, R' taken alone is selected from the group consisting of hydrogen, alkyl, and aralkyl, and the two R's on adjacent carbon atoms may, together with these carbon atoms, form a ring; said branches further comprising up to about 10 parts by weight of monomers of said backbone polymer.

References Cited

UNITED STATES PATENTS 3,088,931   5/1963   Scanley et al. _____ 260—875

SAMUEL H. BLECH, Primary Examiner

U.S. Cl. X.R.

252—49.7, 51.5 R; 260—885